UNITED STATES PATENT OFFICE.

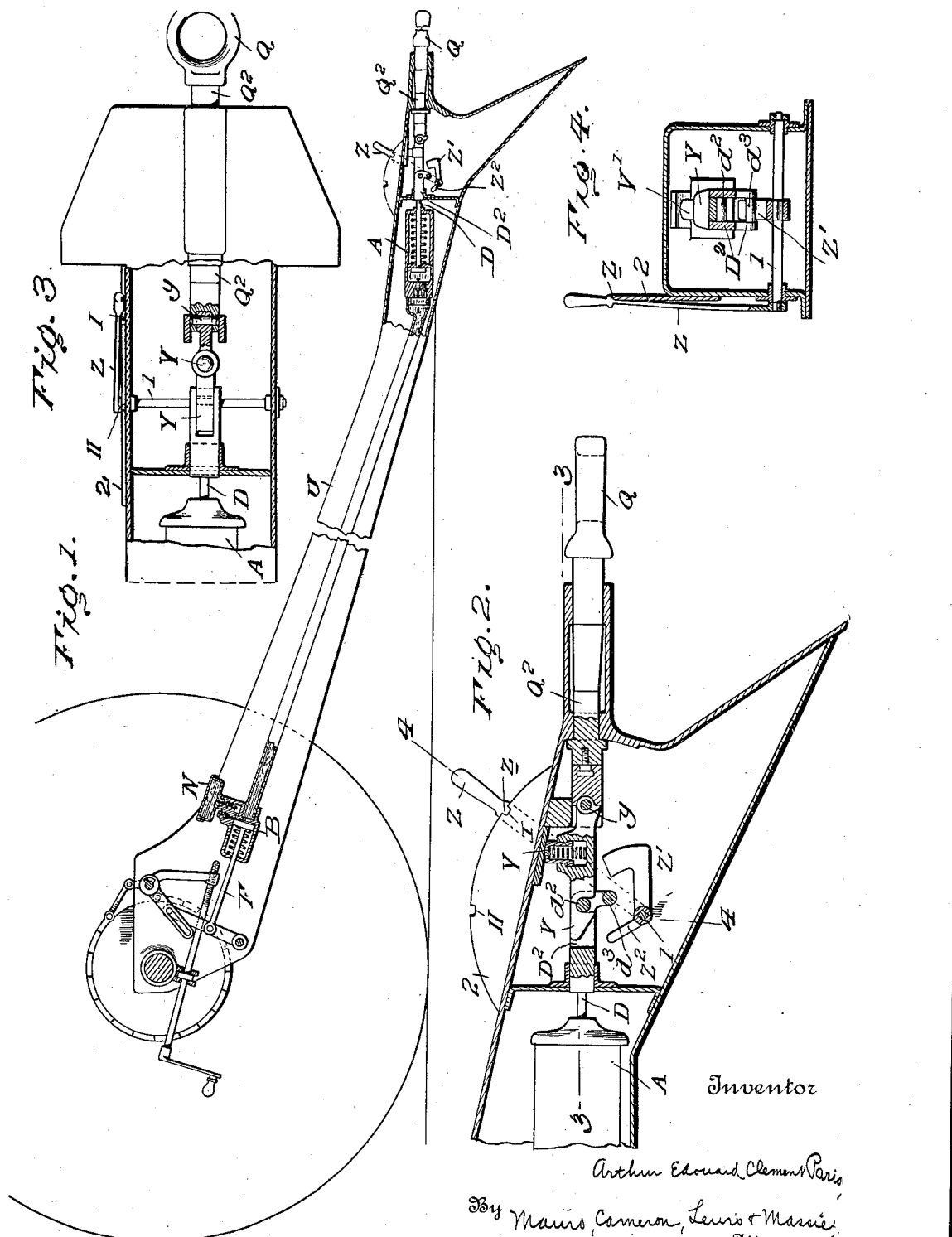

ARTHUR EDOUARD CLÉMENT PARIS, OF PUTEAUX, FRANCE.

AUTOMATIC TRAILER-BRAKE.

1,315,571.   Specification of Letters Patent.   Patented Sept. 9, 1919.

Original application filed February 14, 1918, Serial No. 217,262. Divided and this application filed February 28, 1919. Serial No. 279,831.

*To all whom it may concern:*

Be it known that I, ARTHUR EDOUARD CLÉMENT PARIS, a citizen of the Republic of France, and a resident of Puteaux, Seine, France, have invented a new and useful Improvement in Automatic Trailer-Brakes, which invention is fully set forth in the following specification.

The present invention relates to improvements in automatic apparatus for braking the wheels of motor-car trailers and the rear carriages of guns shown and described but not specifically claimed in my application Sr. No. 217,262, filed Feb. 14, 1918, of which the present application is a division.

These improved devices are designed on the one hand to render the brake of the trailer inoperative when it is desired to cause the tractor with its trailer to execute as a whole a rearward movement through a certain distance. These devices are designed on the other hand to enable the brake of the trailer to be operated by hand if required; the option of operating by hand may be necessary when the tractor and the trailer are to be stopped as a whole on a gradient or in the case of a breakage of the coupling between the tractor and its trailer.

In my application Sr. No. 193,214, filed Sept. 25, 1917, I have described and shown brake apparatus automatically operated by a piston connected through a piston rod with a bar connected to a coupling yoke. In accordance with the present invention, the bar connecting the coupling yoke to the rod of the piston is split up into two elements with a coupling located between them, and mechanism is provided for actuating the element that is fixed to the rod of the piston allowing movement of the latter without moving as will the yoke which is in a fixed or uncoupled state at that moment.

One constructional form of the apparatus is illustrated in the accompanying drawings in which—

Figure 1 is a side elevation of the general arrangement of a wheel brake applied to the wheeled axle of a gun carriage and provided with my improvements;

Fig. 2 is a vertical longitudinal section showing the parts and the apparatus in the normal position for allowing the brake-operating apparatus to operate automatically;

Fig. 3 is a horizontal section on the line 3—3 of Fig. 2;

Fig. 4 is a vertical cross-section on the line 4—4 of Fig. 2.

In Fig. 1, F is a brake rod having a piston working in a cylinder B having a conduit connection U with a piston cylinder A. Fluid is supplied to the cylinders by a reservoir N. This part of the brake-operating apparatus constitutes in substance the subject-matter of my application Sr. No. 193,214, filed Sept. 25, 1917.

In the present constructional form, a connection is provided between the bar $Q^2$ fixed to the yoke Q and the rod D of the piston of the brake-operating cylinder A. This coupling consists of a yoke Y pivoted by means of an axle pin $y$ to the bar $Q^2$ and maintained normally engaged with an axle pin $d^2$ carried by a block $D^2$ fixed to the rod D. A spring $Y^1$ has a constant tendency to depress the hook Y and to maintain it in or return it into the position it occupies in Fig. 2.

Z is a lever fixed on an axle 1 journaled in the sides of the gun carriage. On the handle of this lever Z is a spring stud $z$ which retains the lever swung in different positions by bringing said stud into notches I, II of a sector 2. The lever Z carries a finger with two limbs $Z^1$—$Z^2$. The limb $Z^1$ is arranged to lift the hook Y when the lever is moved from the position of engagement I into the position of engagement II. When the hook has been so lifted, the coupling is opened between the rod D and the yoke Q and the automatic brake-operating apparatus is rendered inoperative.

When it is desired to actuate the brake-operating apparatus by hand, it is merely necessary to move the lever Z to the left beyond the position of engagement II. The nose of the finger $Z^1$ exerts in this movement a pressure upon the axle pin $d^2$ which has been released, while sliding underneath the hook Y and keeping the latter lifted.

If, in starting from one or the other of the positions described above, it is desired to reëstablish the connection between the yoke Q and the rod D, it is merely necessary to move the lever back to the right. In this movement, the finger $Z^1$ disengages from pin $d^2$, moves away from underneath the hook Y and thereby permits the nose of this hook to drop into locking engagement with pin $d^2$. If the movement of the lever is continued toward the right beyond the engagement notch I, the finger $Z^2$, by exerting a pressure upon an axle pin $d^3$ carried by the block $D^2$, will move the latter toward the right, cause the axle pin $d^2$ to slide over the inclined nose of the hook Y, and bring the said axle pin $d^2$ into the notch of the said hook. From this moment the lever Z can be returned into engagement with the engagement notch I.

What is claimed is:—

1. In brake apparatus for trailers and rear gun carriages wherein the operation of the brake mechanism is effected by movement of a normally restrained piston, the combination of an operating rod connected to said piston, a movable yoke bar having a spring-pressed latch normally engaging said piston rod, and manual means adapted to operate in one direction to disconnect said latch and engage said piston rod to move it into braking position and in the opposite direction to move said rod out of braking position and to restore said latch to locking position.

2. In brake apparatus for trailers and rear gun carriages wherein the operation of the brake mechanism is effected by movement of a normally restrained piston, the combination of an operating rod connected to said piston, a movable yoke bar having a spring-pressed latch normally engaging said piston rod, a lever provided with fingers one of which on rocking the lever in one direction is adapted to move into the path of said latch to release the same and on further movement to move said piston rod into braking position, the other finger of which on rocking the lever in the opposite direction engages said piston rod to move the latter into the path of said latch to couple said piston to said yoke bar.

In testimony whereof I have signed this specification.

ARTHUR EDOUARD CLÉMENT PARIS.

Copies of this patent may be obtained for five cents each, by addressing the "Commissioner of Patents, Washington, D. C."